(12) United States Patent
Kogure et al.

(10) Patent No.: US 6,275,027 B1
(45) Date of Patent: Aug. 14, 2001

(54) ROTATION ANGLE SENSOR

(75) Inventors: Yoshihiro Kogure; Hirotsugu Nakazawa, both of Gunma (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/396,424

(22) Filed: Sep. 15, 1999

(30) Foreign Application Priority Data

Sep. 19, 1998 (JP) ................................................. 10-2833304

(51) Int. Cl.[7] ............................ G01B 7/30; G01R 33/07; H01L 43/06
(52) U.S. Cl. ................................. 324/207.2; 324/207.25
(58) Field of Search ..................... 324/207.13, 207.2, 324/207.25; 123/617

(56) References Cited

U.S. PATENT DOCUMENTS

| | | | |
|---|---|---|---|
| 3,530,317 | 9/1970 | Lang | 310/10 |
| 4,392,375 | 7/1983 | Eguchi et al. | 73/118 |
| 5,164,668 | 11/1992 | Alfors | 324/207 |
| 5,811,968 | 9/1998 | Nakazawa et al. | 324/207 |
| 5,889,400 * | 3/1999 | Nakazawa | 324/207.2 |

FOREIGN PATENT DOCUMENTS

| | | |
|---|---|---|
| 197 00 046 | 7/1997 | (DE) . |
| 0 146 312 | 6/1985 | (EP) . |

OTHER PUBLICATIONS

Prospekt der Magnetfabrik Schramberg, Apr. 1997.

* cited by examiner

Primary Examiner—Christine Oda
Assistant Examiner—Henry S. Andersen
(74) Attorney, Agent, or Firm—Foley & Lardner

(57) ABSTRACT

A rotation angle sensor including a magnet rotatable about an axis, a first and second yokes arranged around said magnet and diametrically opposed to each other, and a Hall effect device disposed between the first and second yokes. The yokes include arcuately curved pole piece portions radially opposed to the magnet and overhang portions extending angularly inwardly from the pole piece portions across the axis of the magnet, respectively. The overhang portions have a generally sector shape and cooperate to define a gap therebetween within which the Hall effect device is disposed. Leakage flux reducing members circumferentially extend between the pole piece portions.

17 Claims, 7 Drawing Sheets

ROTATION ANGLE SENSOR

BACKGROUND OF THE INVENTION

Field of the Invention

The present invention relates generally to rotation angle sensors for sensing a rotation angle of a rotatable member, and more particularly to a rotation angle sensor for determining an opening degree of a throttle valve or accelerator employed in an automobile engine.

Rotation angle sensors are generally used for determining an opening degree of a throttle valve or accelerator of automobile engines. The conventional method of determining the opening degree of the throttle valve by using the rotation angle sensors will be explained hereinafter.

Automobile engines with electronically controlled fuel injection system generally include a throttle valve installed in an air intake duct. A rotation angle sensor is provided for detecting an opening degree of the throttle valve. Electrical signal generated from the rotation angle sensor is transmitted to a control unit and processed as output signal indicative of an intake air flow. The control unit computes an amount of fuel injection depending on the intake air flow. As the conventionally proposed rotation angle sensors for automobile engines, there are known those of a non-contact type using a magnet and a yoke around the magnet.

U.S. Pat. No. 5,811,968 discloses a rotation angle sensor including a magnet attached to a rotatable shaft of a throttle valve. An opening degree of the throttle valve varies depending upon the rotation of the shaft. At least three yokes surround the magnet. A plurality of Hall effect devices are disposed between the yokes. The magnet and the yokes cooperate with each other to constitute a plurality of magnetic circuits. Each of the Hall effect devices is incorporated within each magnetic circuit. The plurality of Hall effect devices detect magnetic flux densities in the plurality of magnetic circuits and generate output signals indicative of the magnetic flux densities detected. A rotation angle of the shaft of the throttle valve, i.e., as an opening degree of the throttle valve is determined by using the output signals generated from the Hall effect devices.

Multiple yokes such as the three or more yokes used in the above-described conventional rotation angle sensor, become complicated in configuration because these yokes have multiple bent or cutout portions. Magnetic flux generated by the magnet tends to leak out through the bent or cutout portions of the yokes when the magnetic flux passes into the yokes. Further, in a case where the multiple yokes are arranged along substantially the entire circumference of the magnet with a less space between the respective adjacent two of the multiple yokes, a circumferential leakage flux occurs between the adjacent yokes. This adversely affects the detection results of magnetic flux densities by the Hall effect devices and, therefore, results in inaccurate output signal therefrom. In addition, the arrangement of the multiple yokes within a casing will lead to increase in size of the rotation angle sensor as a whole, number of the components and then the production cost.

SUMMARY OF THE INVENTION

It is an object of the present invention to provide a rotation angle sensor for determining a rotation angle of a rotatable member, which is capable of determining the rotation angle with an increased accuracy by a simple structure, and being reduced in number of components and size of the sensor as a whole.

According to one aspect of the present invention, there is provided a rotation angle sensor, comprising:

a magnet having an axis and rotatable about said axis;

a first yoke arranged around said magnet, said first yoke including a first pole piece portion radially opposed to said magnet and a first overhang portion extending radially inwardly from said first pole piece portion across said axis of said magnet;

a second yoke arranged around said magnet, said second yoke cooperating with said magnet and said first yoke to form a magnetic circuit, said second yoke including a second pole piece portion radially opposed to said magnet and diametrically opposed to said first pole piece portion and a second overhang portion extending radially inwardly from said second pole piece portion across said axis of said magnet, said second overhang portion being opposed to said first overhang portion in a direction of said axis of said magnet; and a signal generating device operative, in response to rotation of said magnet relative to said first and second yokes, to detect a density of magnetic flux generated by said magnet and passing through said first and second yokes and generate an output signal indicative of the density of magnetic flux detected, said signal generating device being disposed between said first and second overhang portions.

According to further aspect of the present invention, there is provided a rotation angle sensor, comprising:

a magnet having an axis and rotatable about said axis;

a first yoke arranged around said magnet, said first yoke including a first pole piece portion radially opposed to said magnet and a first overhang portion extending radially inwardly from said first pole piece portion across said axis of said magnet;

a second yoke arranged around said magnet, said second yoke including a second pole piece portion radially opposed to said magnet and diametrically opposed to said first pole piece portion and a second overhang portion extending radially inwardly from said second pole piece portion across said axis of said magnet, said second overhang portion being opposed to said first overhang portion in a direction of said axis of said magnet;

a signal generating device operative, in response to rotation of said magnet relative to said first and second yokes, to detect a density of magnetic flux generated by said magnet and passing through said first and second yokes and generate an output signal indicative of the density of magnetic flux detected, said signal generating device being disposed between said first and second overhang portions; and leakage flux reducing members configured to reduce a circumferential leakage flux between said first and second pole piece portions.

DESCRIPTION OF THE PREFERRED EMBODIMENT

Referring now to FIGS. 1–7, a first preferred embodiment of a rotation angle sensor according to the present invention is explained.

Figure 1:
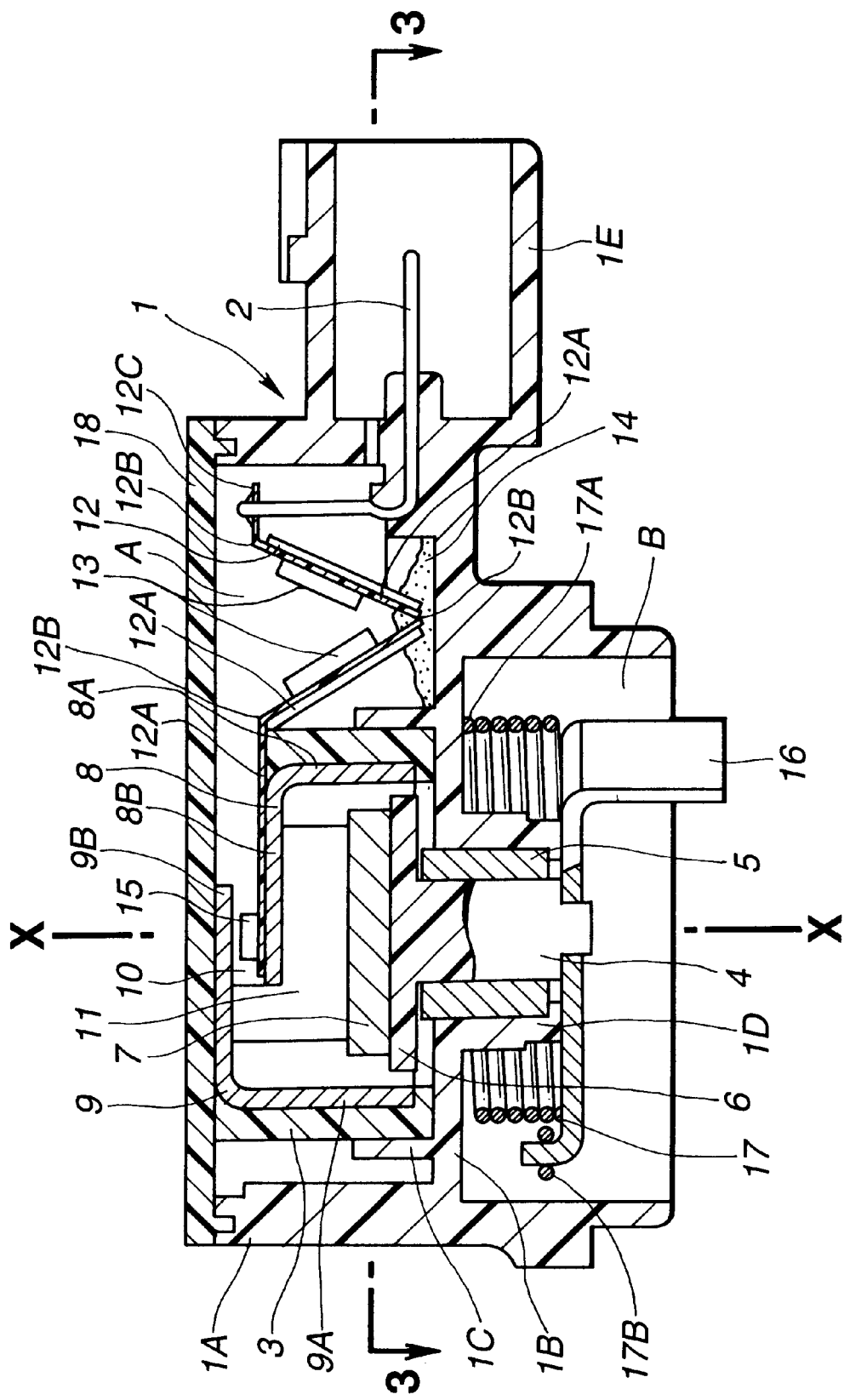
FIG. 1 is a vertical section of a first preferred embodiment of a rotation angle sensor according to the present invention.
Figure 2:
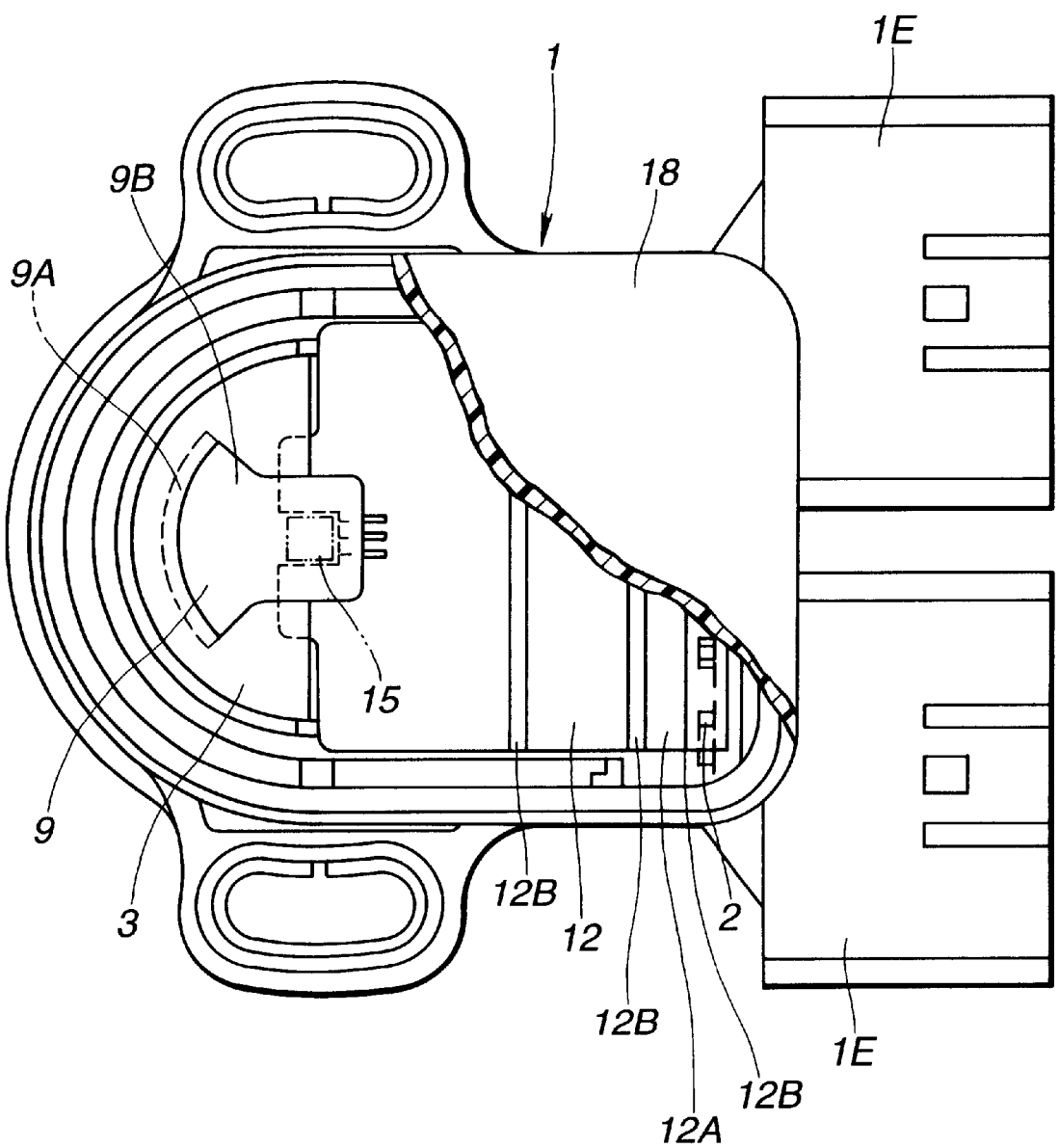
FIG. 2 is a top plan view of the first embodiment, with a cover partly taken away.

As illustrated in FIG. 1, the rotation angle sensor includes a casing 1. The casing 1 includes a generally cylindrical body portion 1A and a partition wall 1B extending radially inwardly from an axial middle part of the cylindrical body portion 1A. The partition wall 1B cooperates with a cover 18 described later to define a storage chamber A within the cylindrical body portion 1A. The cover 18 closes an open end of the cylindrical body portion 1A, thereby preventing the storage chamber A from dusts entering thereinto. The storage chamber A accommodates a yoke retainer 3, a magnet 7, first and second yokes 8 and 9 and other components as explained in detail later. A cylindrical positioning wall 1C extends axially upwardly as viewed in FIG. 1, from the partition wall 1B. The positioning wall 1C is provided for positioning the yoke retainer 3 within the storage chamber A. A cylindrical boss portion 1D extends axially downwardly as viewed in FIG. 1, from the partition wall 1B. The boss portion 1D defines a tubular bore communicating with the storage chamber A. The boss portion 1D and the cylindrical body portion 1A cooperate to form a spring chamber B radially extending therebetween and located below the partition wall 1B. The spring chamber B is provided for installing a return spring 17 described later. A pair of connector portions 1E, 1E radially outwardly extend from an outer periphery of the cylindrical body portion 1A as seen from FIGS. 1 and 2. A plurality of terminal pins 2, only one of which is shown in FIG. 1 for clarity, extend from the connector portions 1E into the storage chamber A. The terminal pins 2 are embedded in the cylindrical body portion 1A of the casing 1.

The yoke retainer 3 is disposed on the partition wall 1B and brought into contact with the positioning wall 1C of the casing 1. The yoke retainer 3 is formed into a generally cylindrical shape and made of a resin material. The yoke retainer 3 is contacted at a lower end thereof with an upper surface of the partition wall 1B and at an upper end thereof with a rear surface of the cover 18. The yoke retainer 3 is thus fixedly supported between the partition wall 1B and the cover 18. The yoke retainer 3 is configured to support the first and second yokes 8 and 9 by using, for example, a resin molding method. The yoke retainer 3 with the first and second yokes 8 and 9 is detachably fitted to the positioning wall 1C of the casing 1 and held in place within the storage chamber A of the casing 1. The yoke retainer 3 thus carries out positioning of the first and second yokes 8 and 9 relative to the magnet 7 within the storage chamber A.

The magnet 7 is mounted to a shaft 4 rotatably received in the tubular bore of the boss portion 1D of the casing 1 through a bearing 5. The magnet 7 having an axis X—X is arranged coaxially with the shaft 4. The magnet 7 rotates about the axis X—X together with the shaft 4 upon rotation of the shaft 4. The shaft 4 has one end portion that projects axially upwardly from the boss portion 1D into the storage chamber A and is formed with a rotating plate 6, as shown in FIG. 1. The rotating plate 6 is integrally formed with the shaft 4 and has a generally disk shape. The magnet 7 is fixed onto the rotating plate 6 by adhesive or the like. The shaft 4 has an opposite end portion projecting axially downwardly from the boss portion 1D and formed with a lever mount on which a lever 16 is secured. The lever 16 has a center portion caulked to the lever mount of the shaft 4 and a distal end portion connected with a lever of a throttle valve (not shown). The lever 16 rotates the shaft 4 upon opening and closing operation of the throttle valve. A rotation of the lever 16 is limited by a cutout (not shown) formed in a wall of the cylindrical body portion 1A. The cutout may circumferentially extend at an angle of approximately 100 degrees around the rotation axis of the shaft 4. The lever 16 is always biased toward an initial position by the return spring 17 disposed within the spring chamber 1B of the casing 1. The return spring 17 is in the form of a coiled spring having one end 17A fixed to a lower surface of the partition wall 1B and an opposite end 17B engaged with the lever 16. The biasing force of the return spring 17 is always applied to the shaft 4 through the lever 16. Thus, the magnet 7 secured to the rotating plate 6 of the shaft 4 is urged to move to an initial position M1 shown in FIG. 6.

Figure 3:
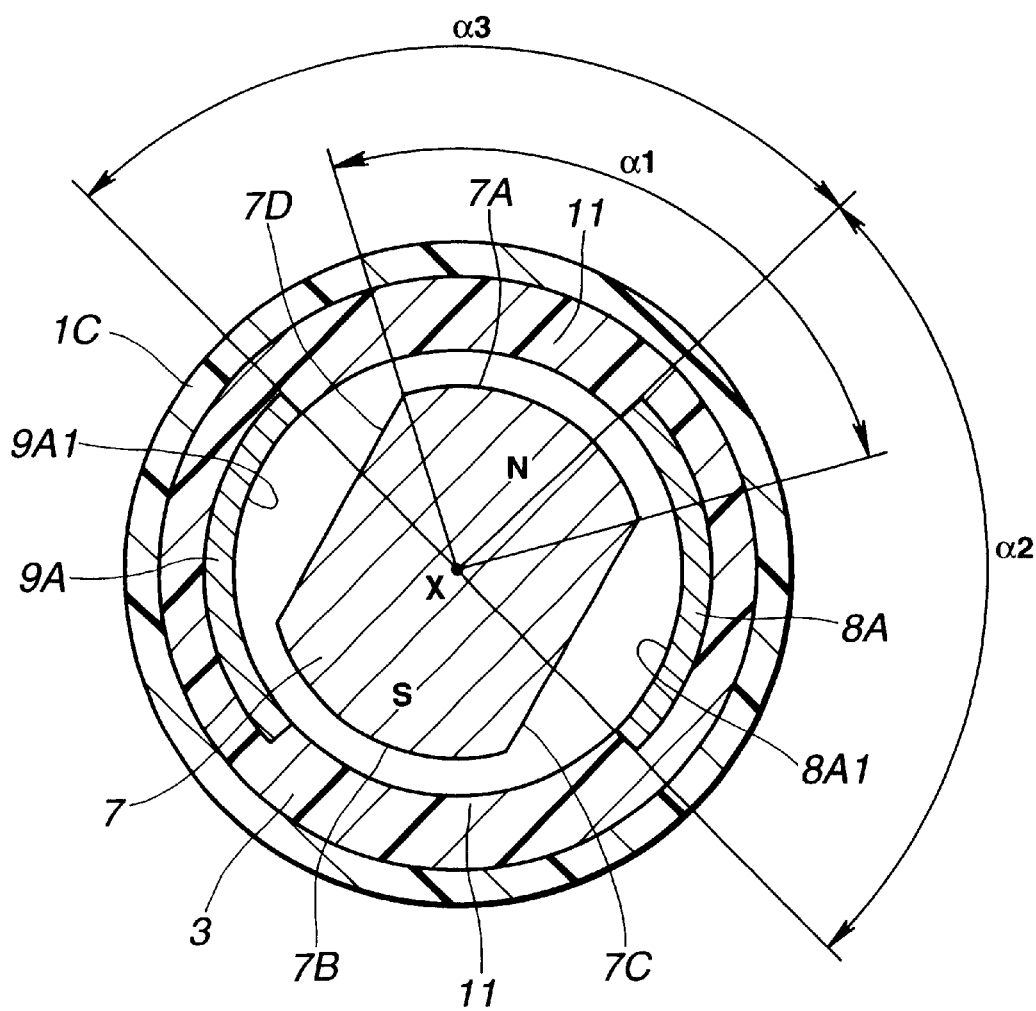
FIG. 3 is a cross section taken along the line 3—3 in FIG. 1, showing a magnet and first and second yokes.

As illustrated in FIG. 3, the magnet 7 has a generally elliptic shape in plan view. The magnet 7 is in the form of the generally elliptic planar plate extending perpendicular to the axis X—X. The magnet 7 includes diametrically opposed and circumferentially extending convex surfaces 7A and 7B and parallel planar surfaces 7C and 7D between the convex surfaces 7A and 7B. The magnet 7 has a North magnetic pole and a South magnetic pole near the convex surfaces 7A and 7B, respectively. The convex surfaces 7A and 7B extend at a predetermined angle $\alpha 1$ around the axis X—X. The predetermined angle $\alpha 1$ may be within a range of 70–120 degrees, and preferably 90 degrees. The magnet 7 is made of a permanent magnet material having a maximum energy product of not more than $20 \times 10^6$ gauss oersted (Oe), for instance, rare-earth bonded magnet Nd—Fe—Co, Sm—Co and the like.

The first and second yokes 8 and 9 supported by the yoke retainer 3 are disposed around the magnet 7. The first and second yokes 8 and 9 cooperate to define a magnetic path for introducing a magnetic flux generated by the magnet 7 to a Hall effect device 15 described later.

Figure 4:
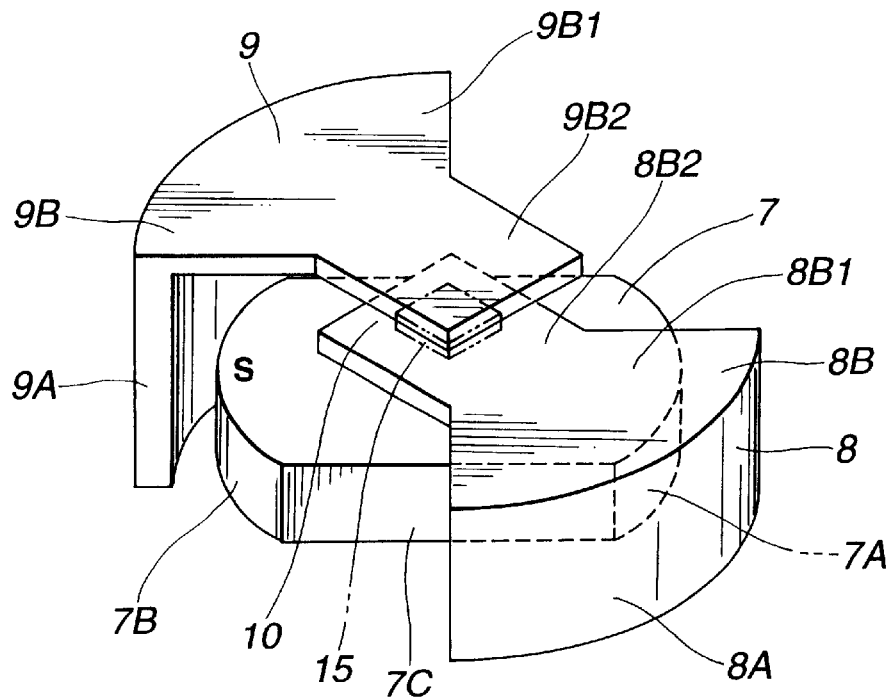
FIG. 4 is a perspective view of the first embodiment, showing the magnet, the first and second yokes and a Hall effect device.
Figure 5:
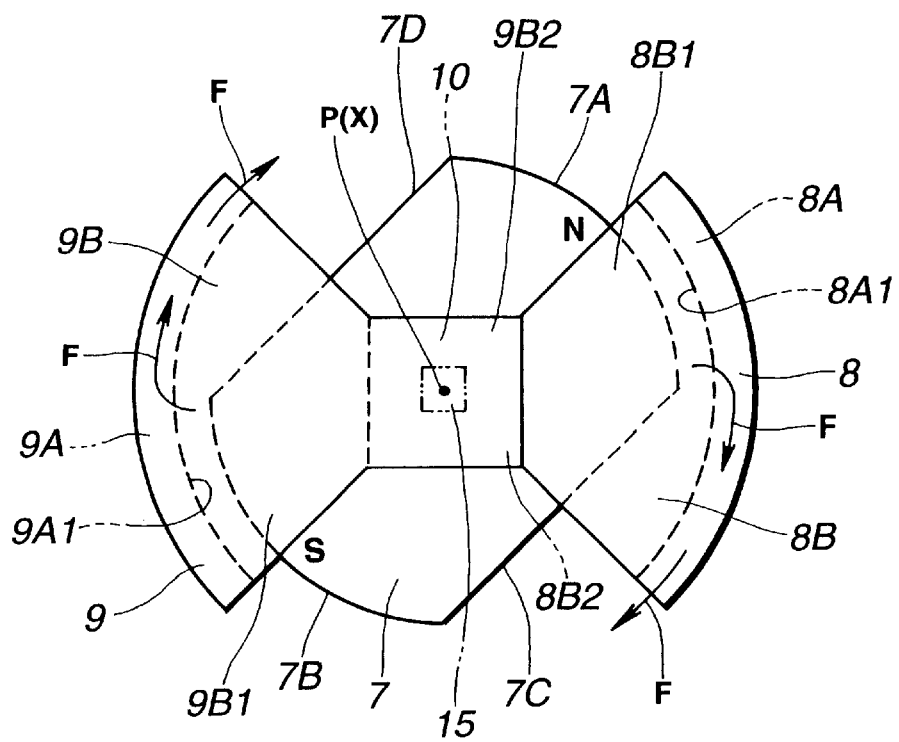
FIG. 5 is a top plan view of the first embodiment, showing the magnet, the first and second yokes and the Hall effect device.

The first yoke 8 is arranged concentrically with the magnet 7 and includes a first pole piece portion 8A having a generally arcuate shape as shown in FIG. 3. The first pole piece portion 8A is opposed to the magnet 7 in a radial direction, i.e., perpendicular to the axis X—X of the magnet 7. The first pole piece portion 8A has a predetermined radius of curvature with respect to the axis X—X of the magnet 7. More specifically, the first pole piece portion 8A includes a concave inner surface 8A1 located concentrically with the convex surfaces 7A and 7B of the magnet 7. The concave inner surface 8A1 circumferentially extends at a predetermined angle $\alpha 2$ around the axis X—X. The predetermined angle $\alpha 2$ of the concave inner surface 8A1 may be substantially equal to the predetermined angle $\alpha 1$ of the convex surfaces 7A and 7B of the magnet 7. In this embodiment, the predetermined angle $\alpha 2$ is approximately 90 degrees. The concave inner surface 8A1 is brought into being opposed to each of the convex surfaces 7A and 7B of the magnet 7 when the magnet 7 rotates about the axis X—X. The concave inner surface 8A1 is spaced apart from the convex surfaces 7A and 7B of the magnet 7 to define a predetermined gap therebetween. The first pole piece portion 8A extends toward the cover 18 along the axis X—X of the magnet 7. The first yoke 8 also includes a first overhang portion 8B extending angularly and radially inwardly from an axial end of the first pole piece portion 8A across the axis X—X of the magnet 7. The first overhang portion 8B is spaced apart from the magnet 7 to define a gap therebetween. The first overhang portion 8B is formed into a planar plate having a generally sector shape shown in FIG. 4. As illustrated in FIGS. 4 and 5, the first overhang portion 8B includes a sectorial connecting portion 8B1 and a generally square or rectangular extension 8B2 connected with the sectorial connecting portion 8B1. The sectorial connecting portion 8B1 has an outer curved periphery connected with the axial end of the first pole piece portion 8A and has a center P on the axis X—X of the magnet 7. The extension 8B2 is connected with an inner periphery of the sectorial connecting portion 8B1 and extends across the axis X—X of the magnet 7. The extension 8B2 has a predetermined surface area.

The second yoke 9 is arranged concentrically with the magnet 7 and similar in shape to the first yoke 8. The second yoke 9 includes a second pole piece portion 9A having a generally arcuate shape and a second overhang portion 9B having a generally sector shape. The second pole piece portion 9A is radially opposed to the magnet 7 and arranged in a diametrically opposed relation to the first pole piece portion 8A. The second pole piece portion 9A includes a concave inner surface 9A1 arranged concentrically with the convex surfaces 7A and 7B of the magnet 7. The concave inner surface 9A1 circumferentially extends at the predetermined angle α2, i.e., approximately 90 degrees in this embodiment, around the axis X—X of the magnet 7, as does the concave inner surface 8A1 of the first pole piece portion 8A. The concave inner surface 9A1 is brought into being opposed to each of the convex surfaces 7A and 7B of the magnet 7 when the magnet 7 rotates about the axis X—X. The concave inner surface 9A1 is spaced apart from the convex surfaces 7A and 7B of the magnet 7 to define a predetermined gap therebetween. The second pole piece portion 9A extends toward the cover 18 along the axis X—X of the magnet 7 farther than the first pole piece portion 8A as best shown in FIG. 1. The second overhang portion 9B extends angularly and radially inwardly from an axial end of the second pole piece portion 9A across the axis X—X of the magnet 7. The second overhang portion 9B is opposed to the first overhang portion 8B in the direction of the axis X—X of the magnet 7 and spaced apart from the first overhang portion 8B. The second overhang portion 9B is configured similar to the first overhang portion 8B, including a sectorial connecting portion 9B1 and a generally square or rectangular extension 9B2. The sectorial connecting portion 9B1 is connected with the axial end of the second pole piece portion 9A. The extension 9B2 is connected with an inner periphery of the sectorial connecting portion 9B1 and extends across the axis X—X of the magnet 7. The extension 9B2 is opposed to the extension 8B2 of the first overhang portion 8B in the direction of the axis X—X of the magnet 7 and spaced apart from the extension 8B2 to define a gap 10 therebetween. The extension 9B2 has substantially same surface area as the predetermined surface area of the extension 8B2 and is aligned with the extension 8B2 when viewed from the direction of the axis X—X as shown in FIG. 5.

The first and second yokes 8 and 9 cooperate with the magnet 7 to form a magnetic circuit. The first and second yokes 8 and 9 are made of a magnetic material having a coercive force of not more than 1 oersted (Oe), for instance, electromagnetic ferrite (SUYB, SUYP), Fe—Ni alloy and the like.

Referring back to FIG. 3, leakage flux reducing members 11, 11 for reducing a circumferential leakage flux between the first and second pole piece portions 8A and 9A are disposed between the first and second pole piece portions 8A and 9A of the first and second yokes 8 and 9. The leakage flux reducing members 11, 11 are radially spaced apart from the magnet 7 and arranged in a diametrically opposed relation to each other. Each leakage flux reducing member 11 circumferentially extends between the first and second pole piece portions 8A and 9A at a predetermined angle α3 around the axis X—X of the magnet 7. The predetermined angle α3 may be within a range of 50–130 degrees, for example, 90 degrees. Preferably, the predetermined angle α3 may be substantially equal to the predetermined angle α1 of the convex surfaces 7A and 7B of the magnet 7. The leakage flux reducing member 11 may be integrally formed with the yoke retainer 3 and may constitute a part thereof. The leakage flux reducing member 11 defines an inner curved surface of the yoke retainer 3 that is circumferentially adjacent to the concave inner surfaces 8A1 and 9A1 of the pole piece portions 8A and 9A of the yokes 8 and 9.

The Hall effect device 15 is disposed within the gap 10 between the extensions 8B2 and 9B2 of the overhang portions 8B and 9B of the first and second yokes 8 and 9. The Hall effect device 15 is mounted onto the extension 8B2 of the overhang portion 8B of the first yoke 8 through a flexible substrate 12. The Hall effect device 15 as a magnetoelectric conversion element is operative, in response to rotation of the magnet 7 relative to the first and second yokes 8 and 9, to detect a density of magnetic flux generated by the magnet 7 and passing through the yokes 8 and 9, and to generate an output signal indicative of the density of magnetic flux detected. The Hall effect device 15 detects the magnetic flux in a direction substantially parallel to the axis X—X of the magnet, namely, the rotation axis of the shaft 4, and perpendicular to lines of the magnetic force produced between the North and South poles. The output signal from the Hall effect device 15 is proportional to the density of magnetic flux detected.

The flexible substrate 12 is arranged within the storage chamber A of the casing 1 in a multiplybent state. As shown in FIG. 1, the flexible substrate 12 includes three component-mounting portions 12A and a connecting portion 12C connected with one of the component-mounting portions 12A. Three bent or angled portions 12B are disposed between the adjacent component-mounting portions 12A and between the one of the component-mounting portions 12A and the connecting portion 12C. The connecting portion 12C is located at one end portion of the flexible substrate 12 and connected with the terminal pins 2 by a suitable fastening means such as soldering. The component-mounting portion 12A located at an opposite end portion of the flexible substrate 12 is placed on the overhang portion 8B of the yoke 8 and carries the Hall effect device 15. The adjacent two component-mounting portions 12A disposed between the component-mounting portion 12A with the Hall effect device 15 and the connecting portion 12C are angularly opposed to each other to form a generally V-shape in section as shown in FIG. 1. The adjacent two component-mounting portions 12A carry thereon circuit devices 13 having signal processing circuits, respectively. The three bent portions 12B are strip-like portions and substantially parallel to one another. The flexible substrate 12 thus is bent at the bent portions 12B. A middle one of the three bent portions 12B is fixed onto the partition wall 1B between the positioning wall 1C and the connector portion 1E by means of adhesive 14.

An operation of the rotation angle sensor of the present invention will be explained hereinafter by referring to FIG. 6.

Figure 6:
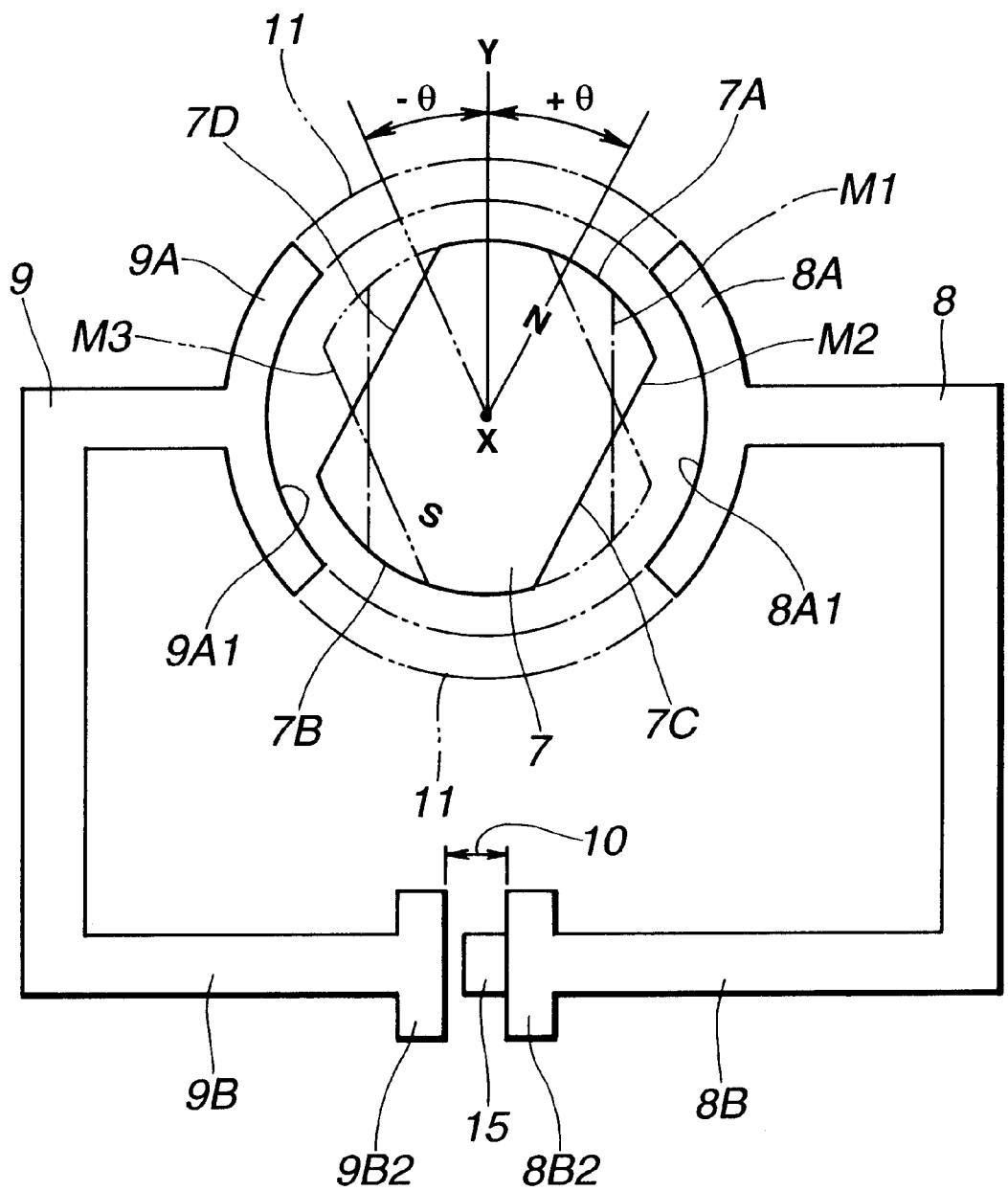
FIG. 6 is a schematic diagram showing positions of the magnet relative to the first and second yokes.

FIG. 6 shows various positions of the magnet 7 in association with the rotation thereof. In FIG. 6, the initial position M1 indicates that the magnet 7 is in a starting position. In this position M1, a center of the convex surface 7A of the magnet 7 is located in a midpoint between the first pole piece portion 8A and the second pole piece portion 9A in the circumferential direction. The center of the convex surface 7A lies on the line X-Y as shown in FIG. 6. A positive position M2 indicates that the magnet 7 clockwise rotates by an angle of +θ around the axis X and the center of the convex surface 7A of the magnet 7 is moved closer to the first pole piece portion 8A. A negative position M3 indicates that the magnet 7 counterclockwise rotates by an angle of −θ around the axis X and the center of the convex surface 7A of the magnet 7 is moved closer to the second pole piece portion 9A. The rotation angle θ of the magnet 7, i.e., the shaft 4, can be determined as an opening degree of the throttle valve by using the output signal generated from the Hall effect device 15. In this embodiment, the rotation angle θ of the magnet 7 is within a range from −45 degrees to +45 degrees. The rotation angle θ of +45 degrees indicates a full throttle position in which an opening degree of the throttle valve is the maximum.

When the magnet 7 is placed in the initial position M1, the convex surface 7A possessing the North pole and the convex surface 7B possessing the South pole are faced to the leakage flux reducing members 11 interposed between the first and second pole piece portions 8A and 9A of the first and second yokes 8 and 9. Less amount of the magnetic flux produced from the North pole of the magnet 7 passes through the first and second yokes 8 and 9 and the Hall effect device 15.

When the magnet 7 clockwise rotates together with the shaft 4 and is placed into the positive position M2, the convex surface 7A with the North pole is partly opposed to the concave inner surface 8A1 of the first pole piece portion 8A and the convex surface 7B with the South pole is partly opposed to the concave inner surface 9A1 of the second pole piece portion 9A. The magnetic flux generated by the magnet 7 is introduced into the first yoke 8 through the area of the concave inner surface 8A1 of the first pole piece portion 8A that faces the convex surface 7A of the magnet 7. The magnetic flux then passes through the Hall effect device 15 and the second yoke 9. At this time, the Hall effect device 15 generates a positive output signal in proportion to a density of the magnetic flux passing through the first and second yokes 8 and 9.

When the magnet 7 counterclockwise rotates to be placed in the negative position M3, the convex surface 7A with the North pole is partly opposed to the concave inner surface 9A1 of the second pole piece portion 9A and the convex surface 7B with the South pole is partly opposed to the concave inner surface 8A1 of the first pole piece portion 8A. The magnetic flux generated by the magnet 7 is introduced into the second yoke 9 through the area of the concave inner surface 9A1 of the second pole piece portion 9A that faces the convex surface 7A of the magnet 7. The magnetic flux then passes through the Hall effect device 15 and the first yoke 8. In this case, the direction of the magnetic flux is reverse to that of the former case. The Hall effect device 15 generates a negative output signal in proportion to a density of the magnetic flux passing through the first and second yokes 8 and 9.

With the arrangement of the leakage flux reducing members 11 between the pole piece portion 8A of the first yoke 8 and the pole piece portion 9A of the second yoke 9, the leakage of the magnetic flux between the pole piece portions 8A and 9A can be reduced as compared with the conventionally proposed pole piece portions arranged along the substantially entire circumference of the magnet. The magnetic flux generated by the magnet 7 as indicated by the arrows F in FIG. 5, can be restrained by the leakage flux reducing members 11 from circumferentially passing between the pole piece portions 8A and 9A of the first and second yokes 8 and 9. Specifically, the magnetic flux leaking out from the circumferentially opposed ends of each of the pole piece portions 8A and 9A can be reduced. Owing to the reduction of the leakage flux, a sufficient amount of the magnetic flux can be introduced into the Hall effect device 15 through the overhang portions 8B and 9B of the first and second yokes 8 and 9. The Hall effect device 15 is less influenced by external magnetic field and then the SN ratio is improved. This can enhance the sensitivity of the Hall effect device 15 upon detection of the rotation angle θ0 of the magnet 7, thereby increasing a performance of the rotation angle sensor.

Further, the first and second yokes 8 and 9 have a simple configuration in which the overhang portions 8B and 9B are bent relative to the pole piece portions 8A and 9A at their circumferentially extending peripheries where the pole piece portions 8A and 9A are connected with the corresponding overhang portions 8B and 9B.

Furthermore, since the extension 8B2 of the overhang portion 8B of the first yoke 8 and the extension 9B2 of the overhang portion 9B of the second yoke 9 have substantially same surface area and are aligned with each other with the gap 10, the magnetic flux generated by the magnet 7 can be prevented from locally concentratedly passing through the gap 10. Lines of the magnetic flux, therefore, can pass substantially parallel to one another through the gap 10 within which the Hall effect device 15 disposed. This can reduce errors in detection of the magnetic flux by the Hall effect device 15.

In addition, as explained above, the predetermined angle α2 at which each of the concave inner surfaces 8A1 and 9A1 of the first and second pole piece portions 8A and 9A circumferentially extends around the axis X—X of the magnet 7 is substantially equal to the predetermined angle α1 at which each of the convex surfaces 7A and 7B of the magnet 7 circumferentially extends around the axis X—X. With this arrangement, the area of the concave inner surface 8A1 that faces the convex surface 7A and the area of the concave inner surface 9A1 that faces the convex surface 7A can be substantially same. Upon rotation of the magnet 7 in the clockwise and counterclockwise direction, each of the areas of the concave inner surfaces 8A1 and 9A1 opposed to the convex surface 7A is variable corresponding to the rotation angle θ of the magnet 7. A density of the magnetic flux passing through each of the first and second yokes 8 and 9, therefore, is variable corresponding to the rotation angle θ of the magnet 7. This arrangement serves for improving accuracy of the detection of the density of the magnetic flux by the Hall effect device 15.

Further, the positioning of the Hall effect device 15 within the gap 10 between the overhang portions 8B and 9B of the yokes 8 and 9 can be readily carried out by using the flexible substrate 12. The flexible substrate 12 that mounts the Hall effect device 15 is arranged in the gap 10. The flexible substrate 12 also mounting the signal processing circuit device 13 can be arranged within a limited space of the casing 1 by being bent at the bending portions 12B. This arrangement of the flexible substrate 12 serves for reducing size of the casing 1.

As described above, the rotation angle sensor of the present invention has a simple structure in which the magnet 7 and the two yokes 8 and 9 form a magnetic circuit and the Hall effect device 15 is disposed in the magnetic circuit. As compared with the conventionally proposed rotation angle sensor, the rotation angle sensor of the present invention can be reduced in number of components and decreased in size as a whole, thus contributing to cost-saving.

Figure 7:
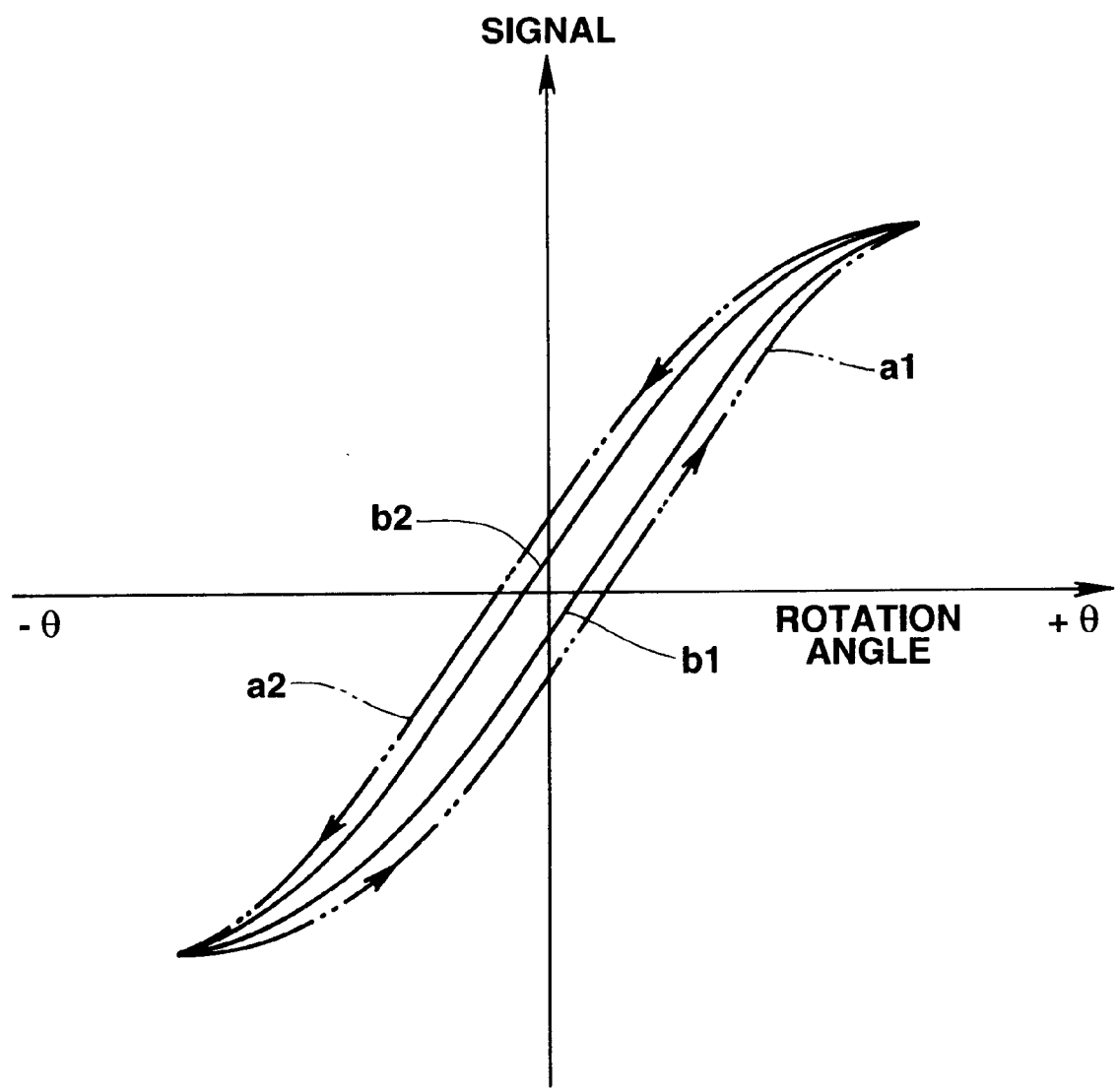
FIG. 7 illustrates a relationship between a rotation angle of a magnet and an output signal generated from a Hall effect device.

Referring to FIG. 7, a relationship between the rotation angle θ and the output signal generated from the Hall effect device 15 now is explained.

In FIG. 7, hysteresis of the output signal generated from the Hall effect device 15 in response to change of the rotation angle θ in the above first embodiment is indicated by curves b1 and b2, while hysteresis of the same in a less preferred embodiment is indicated by curves a1 and a2. The curves a1 and b1 show the output signals generated when the rotation angle θ varies from −θ to +θ upon the clockwise rotation of the shaft 4. The curves a2 and b2 show the output signals generated when the rotation angle θ varies from +θ to −θ upon the counterclockwise rotation of the shaft 4. In the first embodiment described above, the magnet 7 is made of a permanent magnet material having a maximum energy product of not more than 20×10$^6$ gauss oersted (Oe) and the first and second yokes 8 and 9 are made of a magnetic material having a coercive force of not more than 1 oersted (Oe). In the less preferred embodiment, the magnet 7 is made of a permanent magnet material having an energy product larger than that of the first embodiment, and the first and second yokes 8 and 9 are made of a magnetic material having a coercive force greater than that of the first embodiment. As seen from FIG. 7, as compared with the hysteresis of the output signal in the less preferred embodiment, the output signal in the first embodiment exhibits the hysteresis better-controlled. Namely, the difference in the output signal between the curves b1 and b2 of the first embodiment is smaller than the difference between the curves a1 and a2 of the less preferred embodiment. The hysteresis in the less preferred embodiment occurs due to a greater amount of the residual magnetic flux that remains in the yokes 8 and 9 after the magnet 7 moves away from the yokes 8 and 9. In the first embodiment, the residual magnetic flux in the yokes 8 and 9 is reduced and the magnetic flux generated by the magnet 7 is smaller, so that the hysteresis of the output signal is better-controlled with the smaller difference between the curves b1 and b2. This can suppress fluctuation of the output signal, serving for enhancing reliability of the rotation angle sensor.

Figure 8:
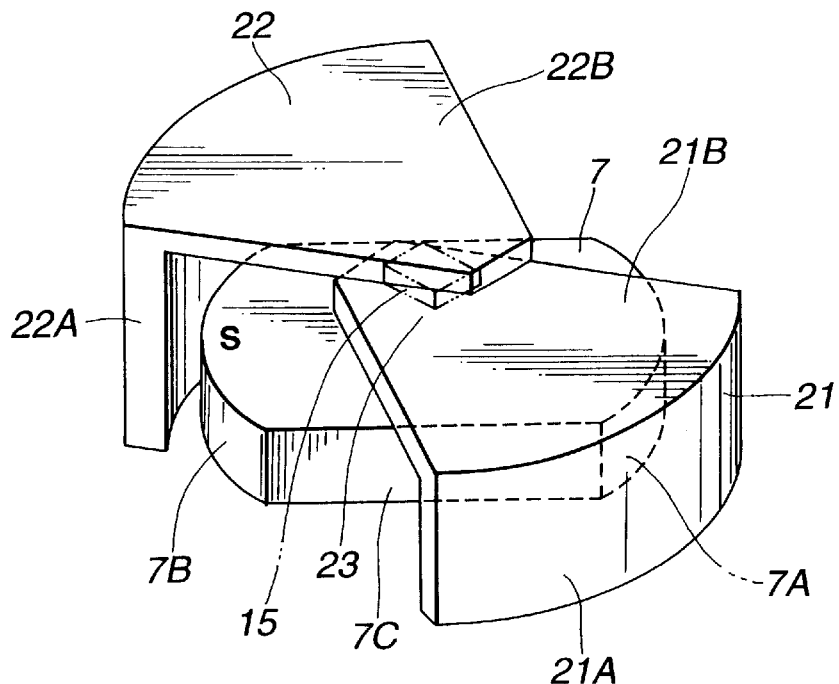
FIG. 8 is a perspective view similar to FIG. 4, but showing a second preferred embodiment of the rotation angle sensor.
Figure 9:
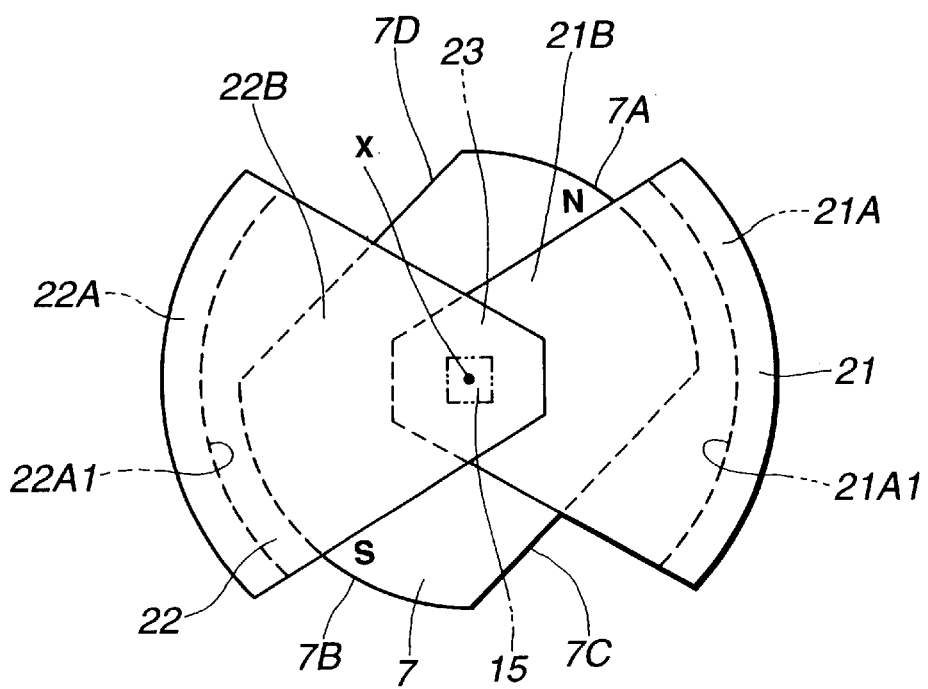
FIG. 9 is a top plan view similar to FIG. 5, but showing the second embodiment of the rotation angle sensor.

Referring to FIGS. 8 and 9, the second preferred embodiment of the rotation angle sensor now is explained. The second embodiment is similar to the above-described first embodiment except for configuration of the overhang portions of the first and second yokes. Like reference numerals denote like parts and therefore detailed explanations therefor are omitted.

As illustrated in FIGS. 8 and 9, the rotation angle sensor of the second embodiment includes a first yoke 21 and a second yoke 22 that are arranged around the magnet 7. The first yoke 21 includes a first pole piece portion 21A formed into a generally arcuate shape and radially opposed to the convex surface 7A of the magnet 7. The first pole piece portion 21A has a predetermined radius of curvature with respect to the axis X—X of the magnet 7. The first pole piece portion 21A includes a concave inner surface 21A1 arranged concentrically with the convex surfaces 7A and 7B of the magnet 7 and spaced apart therefrom to define a predetermined gap therebetween. The concave inner surface 21A1 circumferentially extends at a predetermined angle, for example, approximately 90 degrees, around the axis X—X of the magnet 7. The concave inner surface 21A1 comes into being opposed to each of the convex surfaces 7A and 7B of the magnet 7 during rotation of the magnet 7. The first yoke 21 also includes a first overhang portion 21B formed into a generally sector-shaped planar plate. The first overhang portion 21B extends angularly and radially inwardly from an axial end of the first pole piece portion 21A across the axis X—X of the magnet 7. The first overhang portion 21B is opposed to the magnet 7 in the direction of the axis X—X of the magnet 7. As shown in FIG. 9, the first overhang portion 21B is configured into the sectorial shape having a center that is located beyond the axis X—X of the magnet 7. The first overhang portion 21B thus is provided as one part, differing from the overhang portion 8B of the first yoke 8 of the first embodiment that is constituted by the sectorial connecting portion 8B1 and the rectangular extension 8B2.

Similar to the first yoke 21, the second yoke 22 includes a second pole piece portion 22A having a generally arcuate shape and a second overhang portion 22B having a generally sector shape. The second pole piece portion 22A is arranged in a concentrical and radially opposed relation to the magnet 7. The second pole piece portion 22A is diametrically opposed to the first pole piece portion 21A. The second pole piece portion 22A includes a concave inner surface 22A1 spaced apart from the convex surfaces 7A and 7B of the magnet 7 to define a predetermined gap therebetween. The concave inner surface 22A1 circumferentially extends at a predetermined angle, for instance, approximately 90 degrees, around the axis X—X of the magnet 7. The concave inner surface 22A1 comes into being opposed to each of the convex surfaces 7A and 7B of the magnet 7 during rotation of the magnet 7. The second pole piece portion 22A extends toward the cover 18 along the axis X—X of the magnet 7 farther than the first pole piece portion 21A. The second overhang portion 22B extends angularly and radially inwardly from an axial end of the second pole piece portion 22A across the axis X—X of the magnet 7. The sector-shaped second overhang portion 22B has a center that is located beyond the axis X—X of the magnet 7, as well as the first overhang portion 21B. The second overhang portion 22B is opposed to the magnet 7 and the first overhang portion 21B in the direction of the axis X—X of the magnet 7. The second overhang portion 22B is spaced apart from the first overhang portion 21B to define a gap 23 therebetween in which the Hall effect device 15 is disposed. Specifically, the Hall effect device 15 is mounted to a hexagonal portion of the first overhang portion 21B that is opposed to a hexagonal portion of the second overhang portion 22B as shown in FIG. 9.

The second embodiment can perform substantially same effect as the above-described first embodiment.

The above-described first and second embodiments show the arrangement in which the rotatable shaft 4 is disposed within the casing 1. The present invention is not limited to these embodiments and can be applied to another arrangement. Such arrangement is, for instance, that a shaft of a throttle valve is disposed within a housing that includes a throttle body and a case connected with the throttle body. A magnet is mounted to the shaft of the throttle valve and yokes and a Hall effect device are disposed within the case.

Further, two Hall effect devices may be arranged within the gap 10 and 23. Such arrangement can increase reliability in a case where fault occurs in one of the two Hall effect devices.

What is claimed is:

1. A rotation angle sensor comprising:

a magnet, said magnet having an axis about which said magnet is rotatable;

a first yoke arranged around said magnet, said first yoke including a first pole piece portion radially opposed to said magnet and a first overhang portion extending radially inwardly from said first pole piece portion across said axis of said magnet;

a second yoke arranged around said magnet, said second yoke cooperating with said magnet and said first yoke to form a magnetic circuit, said second yoke including a second pole piece portion radially opposed to said magnet and diametrically opposed to said first pole piece portion and a second overhang portion extending radially inwardly from said second pole piece portion across said axis of said magnet, said second overhang portion being opposed to said first overhang portion in a direction of said axis of said magnet; and a signal generating device operative, in response to rotation of said magnet relative to said first and second yokes, to detect a density of magnetic flux generated by said magnet and passing through said first and second yokes and generate an output signal indicative of the density of magnetic flux detected, said signal generating device being disposed between said first and second overhang portions;

a flexible substrate to which said signal generating device is mounted, and a casing enclosing said magnet, said first and second yokes, said signal generating device and said flexible substrate, said flexible substrate being arranged in a bent state within said casing.

2. A rotation angle sensor comprising:

a magnet, said magnet having an axis about which said magnet is rotatable;

a first yoke arranged around said magnet, said first yoke including a first pole piece portion radially opposed to said magnet and a first overhang portion extending radially inwardly from said first pole piece portion across said axis of said magnet;

a second yoke arranged around said magnet, said second yoke cooperating with said magnet and said first yoke to form a magnetic circuit, said second yoke including a second pole piece portion radially opposed to said magnet and diametrically opposed to said first pole piece portion and a second overhang portion extending radially inwardly from said second pole piece portion across said axis of said magnet, said second overhang portion being opposed to said first overhang portion in a direction of said axis of said magnet; and a signal generating device operative, in response to rotation of said magnet relative to said first and second yokes, to detect a density of magnetic flux generated by said magnet and passing through said first and second yokes and generate an output signal indicative of the density of magnetic flux detected, said signal generating device being disposed between said first and second overhang portions; and wherein said first and second yokes are made of a magnetic material having a coercive force not more than one oersted and said magnet is made of a permanent magnet material having a maximum energy product not more than $20 \times 10^6$ gauss oersted.

3. A rotation angle sensor, comprising:

a magnet, said magnet having an axis about which said magnet is rotatable and which passes through said magnet at a point essentially equidistant from opposed ends of the magnet;

a first yoke arranged around said magnet, said first yoke including a first pole piece portion radially opposed to said magnet and a first overhang portion extending radially inwardly from said first pole piece portion across said axis of said magnet;

a second yoke arranged around said magnet, said second yoke including a second pole piece portion radially opposed to said magnet and diametrically opposed to said first pole piece portion and a second overhang portion extending radially inwardly from said second pole piece portion across said axis of said magnet, said second overhang portion being opposed to said first overhang portion in a direction of said axis of said magnet;

a signal generating device operative, in response to rotation of said magnet relative to said first and second yokes, to detect a density of magnetic flux generated by said magnet and passing through said first and second yokes and generate an output signal indicative of the density of magnetic flux detected, said signal generating device being disposed between said first and second overhang portions; and leakage flux reducing members configured to reduce a circumferential leakage flux between said first and second pole piece portions.

4. A rotation angle sensor as claimed in claim 3, wherein said leakage flux reducing members circumferentially extend between said first and second pole piece portions at a predetermined angle around said axis of said magnet.

5. A rotation angle sensor as claimed in claim 4, wherein said predetermined angle is within a range of 50 to 130 degrees.

6. A rotation angle sensor as claimed in claim 3, wherein said first and second overhang portions of said first and second yokes have a generally sector shape.

7. A rotation angle sensor as claimed in claim 6, wherein said first overhang portion of said first yoke includes a first sectorial connecting portion connected with said first pole piece portion and a first extension connected with said first sectorial connecting portion and extending across said axis of said magnet, and said second overhang portion of said second yoke includes a second sectorial connecting portion connected with said second pole piece portion and a second extension connected with said second sectorial connecting portion and extending over said first extension to define a gap therebetween in which said signal generating device being disposed, said first and second extensions of said first and second overhang portions have substantially same surface area.

8. A rotation angle sensor as claimed in claim 7, wherein said first and second extensions of said first and second overhang portions are aligned in the direction of said axis of said magnet.

9. A rotation angle sensor as claimed in claim 3, wherein said magnet includes diametrically opposed and circumferentially extending convex surfaces having different magnetic poles, said first and second pole piece portions including circumferentially extending concave surfaces opposed to the convex surfaces of said magnet.

10. A rotation angle sensor as claimed in claim 9, wherein said convex surfaces of said magnet extend at a second predetermined angle around said axis.

11. A rotation angle sensor as claimed in claim 10, wherein said second predetermined angle is within a range of 70 to 120 degrees.

12. A rotation angle sensor as claimed in claim 3, wherein said first and second pole piece portions of said first and second yokes extend at a third predetermined angle around said axis of said magnet.

13. A rotation angle sensor as claimed in claim 12, wherein said third predetermined angle is substantially equal to said second predetermined angle.

14. A rotation angle sensor as claimed in claim 3, wherein said signal generating device is a magneto-electric conversion element.

15. A rotation angle sensor as claimed in claim 3, further comprising a flexible substrate to which said signal generating device is mounted, and a casing enclosing said magnet, said first and second yokes, said signal generating device and said flexible substrate, said flexible substrate being arranged in a bent state within said casing.

16. A rotation angle sensor as claimed in claim 3, wherein said first and second yokes are made of a magnetic material having a coercive force not more than one oersted and said magnet is made of a permanent magnet material having a maximum energy product not more than $20 \times 10^6$ gauss oersted.

17. A rotation angle sensor as claimed in claim 3, wherein said leakage flux reducing members are made of a non-magnetic material.

* * * * *